United States Patent [19]

Morgan

[11] 4,192,522
[45] Mar. 11, 1980

[54] HIGHWAY VEHICLE SPLASH AND SPRAY CONTROL SHIELD

[76] Inventor: John H. Morgan, 4905 Linda Ave., Baltimore, Md. 21236

[21] Appl. No.: 933,287

[22] Filed: Aug. 14, 1978

[51] Int. Cl.² ............................................. B62D 25/16
[52] U.S. Cl. ............................................... 280/154.5 R
[58] Field of Search ................................. 280/154.5 R

[56] References Cited

U.S. PATENT DOCUMENTS

| | | | |
|---|---|---|---|
| 3,913,948 | 10/1975 | Gee et al. | 280/154.5 R |
| 3,922,003 | 11/1975 | Lea | 280/154.5 R |

FOREIGN PATENT DOCUMENTS 2525344  9/1976  Fed. Rep. of Germany .... 280/154.5 R

*Primary Examiner*—Robert R. Song

[57] ABSTRACT

This invention is a splash and spray control shield for the wheels of large vehicles, such as trucks and trailers, and is designed to control the wet weather splash and spray generated by the centrifugal force of the forward rotation of the wheels of such a vehicle traveling over wet road surfaces. This shield consists of a unit with sidewalls that covers the uppermost forward part, over the top of and the uppermost rearward part of the wheel or dual wheels, or wheels of adjacent axles. The uppermost forward section of this shield consists of an air collector known as a "scoop"—which is aerodynamically designed to collect and direct the flow of air caused by the forward movement of the vehicle, across the top of, backwardly and downward, behind the wheel or wheels or most rearward wheels of a set of adjacent axles, directly to the road surface. This flow of air transports wet weather road surface material such as water, snow, salt, mud, pebbles, and the like, which usually emanates as splash and spray, on a downward direction and returns it to the road surfaces so as not to discharge it into adjacent traffic lanes. The front and rear of the wheel opening on each side of the shield is arcuately shaped in approximate conformity with the arcuacy of the wheel periphery and this wheel opening has a resilient extension which will increase its effectiveness and will provide ease in tire and wheel maintenance. A resilient shield extension is fastened to the lowermost rear section of the shield to aid in returning the wet weather mixture to the road surface.

4 Claims, 5 Drawing Figures

HIGHWAY VEHICLE SPLASH AND SPRAY CONTROL SHIELD

BACKGROUND

This invention relates to a device to control wet weather splash and spray generated by the rotation of the wheels of large vehicles, such as trucks and trailers, during forward movement over a wet road surface. In the time of wet weather conditions, the centrifugal force of the forward rotation of the wheels of large vehicles such as trucks and trailers, causes road surface materials, such as water, snow, mud, peebles, salt and the like to be propelled up into the turbulent air after striking upper flat surfaces of the undersides of the truck or trailers body and frame, which results in this substance being converted into a lateral spray and mist of fine droplets of water, salt, mud, and the like. This lateral spray is dispersed into adjacent traffic lanes and becomes a very dangerous traffic hazard both to the operator of the truck and the operator of other vehicles following or attempting to overtake the truck.

Many attempts have been made to solve this problem, such as the use of mud flaps, fenders, and various other devices, but to date none have been effective in the control of wet weather splash and spray.

SUMMARY

The object of this present invention is to provide a means to control the wet weather splash and spray generated by the centrifugal force of the forward rotation of the wheels of large vehicles, such as trucks and trailers, traveling over wet road surfaces. More specifically, the means provided by the present invention is a shield consisting of a unit with side walls that covers the uppermost forward part, over the top of and the uppermost rearward part of the wheel, or dual wheels or wheels of adjacent axles. The uppermost forward section of this shield consists of an air collector known as a "scoop"—which is aerodynamically designed to collect and direct the flow of air caused by the forward movement of the vehicle, across the top of, backwardly and downward, behind the wheel or wheels or most rearward wheel of a set of adjacent axles directly to the road surface. This flow of air transports wet weather road surface material, such as water, snow, salt, mud, pebbles, and the like, which usually emanates as splash and spray, on a downward direction and returns it to the road surfaces so as not to discharge it into adjacent traffic lanes. The front and rear of the wheel opening on each side of the shield is arcuately shaped in approximate conformity with the arcuacy of the wheel periphery and this wheel opening has a resilient extension which will increase its effectiveness and will provide ease in tire and wheel maintenance. There is a shield extension fastened to the lowermost rear section of the shield to aid in returning the wet weather mixture to the road surface. The effectiveness of the present invention increases as the speed of the vehicle increases. Research has proven that the splash and spray condition worsens as the speed of the vehicle increases. The present invention utilizes the increased air flow from the increased speed of the vehicle to control the splash and spray. Thus, the higher the speed of the vehicle, the more efficient the invention becomes.

Another objective of the invention is to promote highway safety through the use of this invention. The utilization of the invention would create better driving conditions during wet weather conditions, thus reducing hazards which cause highway accidents.

Another objective of the invention is to create increased visibility in traffic during wet weather conditions, for both trucks and other vehicles.

Another objective of the invention is to protect the equipment of the large vehicle utilizing the spray shield. The invention would protect the underside of the vehicle from dirt, salt, snow, road debris, gravel, tar, and the like.

Another objective of the invention is to control wheel and road noise, increasing driver comfort and alertness.

Another objective of the invention is the utilization of the air flow to lower the operating temperature of the vehicle's tires and brakes, which will result in reduced wear on the same tires and brakes.

Another objective of this invention is to provide an aerodynamically designed air collector, known as a "scoop", in a kit form, that can be utilized in combination with many different types or models of guards to convert them into a highway vehicle splash and spray shield utilizing the theory of the present invention.

DESCRIPTION OF THE PREFERRED EMBODIMENTS

Figure 1:
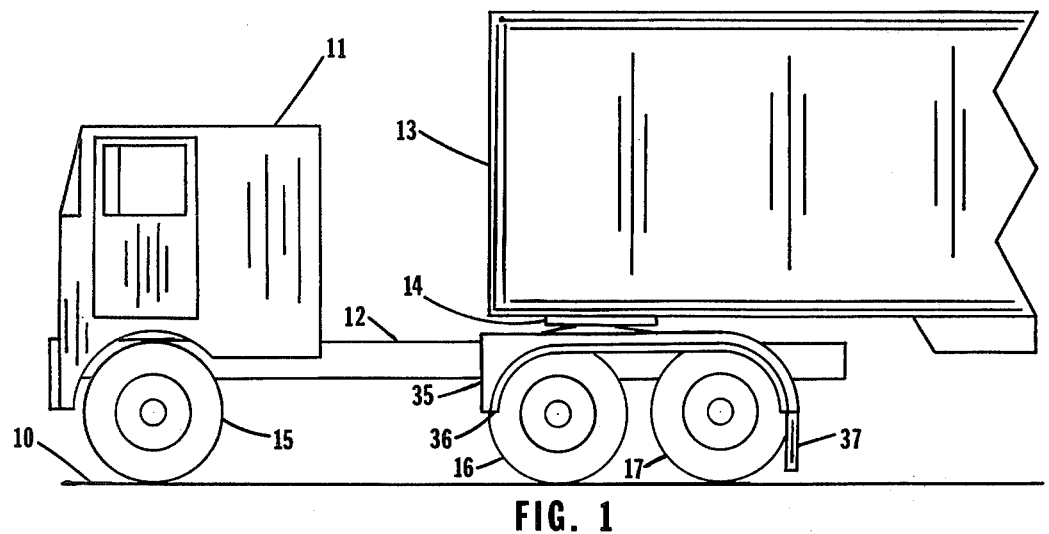
FIG. 1 is a fragmentary view in side elevation, displaying a highway truck tractor, part of a highway tractor-trailer combination, equipped with a splash and spray shield according to this invention.

Referring more specifically to the drawings:

FIG. 1 illustrates a truck tractor 11 connected to a trailer 13 by means of a "fifth wheel" 14. Trailer 13 is only fragmentarily shown. Truck tractor 11 is supported for movement on road surface 10 by front wheels 15 and tandem rear wheels 16 and 17 with their axles parallel to each other so that the wheels 16 and 17 are spaced closely from front to back. Rear wheels 16 and 17 of tractor 11 are equipped with a Highway Vehicle Splash and Spray Control Shield 35 embodying this invention.

Figure 2:
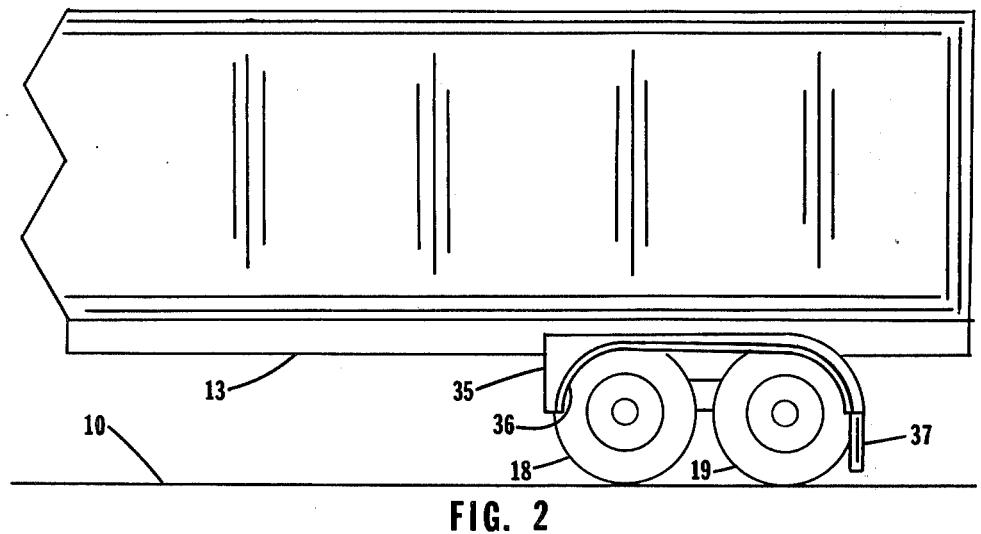
FIG. 2 is a fragmentary view in side elevation, displaying a tandem axle trailer, part of a highway tractor-trailer combination, equipped with a splash and spray shield according to this invention.

FIG. 2 illustrates trailer 13 in a fragmentary view in side elevation. Supported on road surface 10 by tandem rear wheels 18 and 19 with their axles parallel to each other so that the wheels 18 and 19 are spaced closely from front to back. Wheels 18 and 19 of trailer 13 are equipped with a Highway Vehicle Splash and Spray Control Shield 35 embodying this invention.

Figure 3:
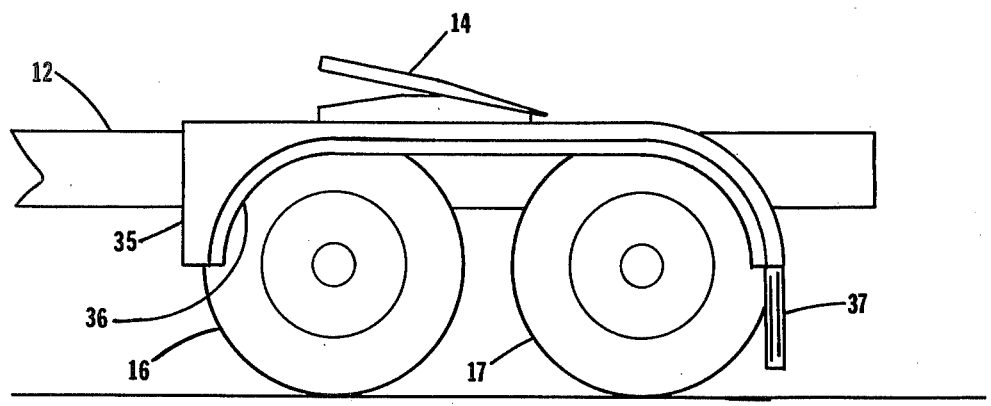
FIG. 3 is a fragmentary view in side elevation, displaying the rear tandem axles of a highway truck tractor not connected to the truck-trailer equipped with a splash and spray shield according to this invention. This drawing is illustrated on a slightly enlarged scale.

FIG. 3 illustrates tractor 11 in a fragmentary view in side elevation not connected to trailer 13. This drawing is on a slightly larger scale. Rear wheels 16 and 17 of tractor 11 are equipped with a Highway Vehicle Splash and Spray Control Shield 35 embodying this invention. Shield 35 consists of a unit with side walls that covers the uppermost forward part of wheel 16 over the top of wheels 16 and 17 and the uppermost rearward part of wheel 17. The uppermost forward section of shield 35 consists of an air collector known as a "scoop"—which is aerodynamically designed to collect and direct the flow of air caused by the forward movement of the vehicle, across the top of wheels 16 and 17, backwardly and downward behind wheel 17 directly to the road surface. The front and rear of the wheel opening in the side wall on each side of shield 35 is arcuately shaped in approximate conformity with the arcuacy of the wheel periphery and this wheel opening has a resilient extension 36 which is continuous from front to back and is arcuately shaped in approximate conformity with the arcuacy of the wheel periphery. A resilient shield extension 37 is fastened to the lowermost rear section of shield 35.

Figure 4:
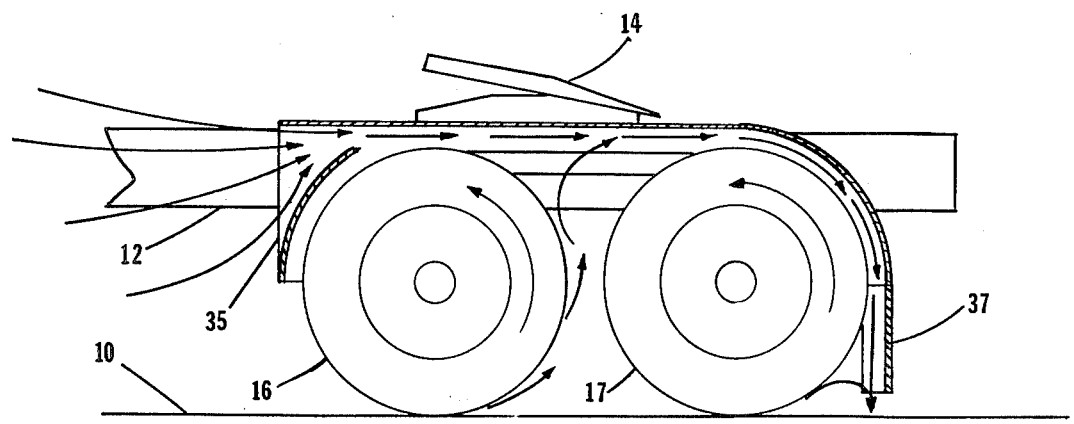
FIG. 4 is a fragmentary side cross sectional view of the splash and spray shield, according to this invention, mounted on the rear tandem axles of a highway truck tractor not connected to the truck trailer.

FIG. 4 illustrates a sectional side view of shield 35 attached to tractor 11 (only fragmentarily shown). Tractor 11 is not connected to trailer 13. The uppermost forward section of the shield 35 consists of an air collector known as a "scoop", which is aerodynamically designed to collect and direct the flow of air caused by the forward movement of the vehicle, across the top of wheels 16 and 17, backwardly and downward, behind wheel 17 directly to the road surface with the aid of shield extension 37. This flow of air transports wet weather road surface material, such as water, snow, salt, mud, pebbles, and the like; which is expelled by the centrifugal force of the forward rotation of the wheels of such a vehicle traveling over wet road surfaces, and usually emanates as splash and spray, on a downward direction and returns it to the road surfaces so as not to discharge it into adjacent traffic lanes.

Figure 5:
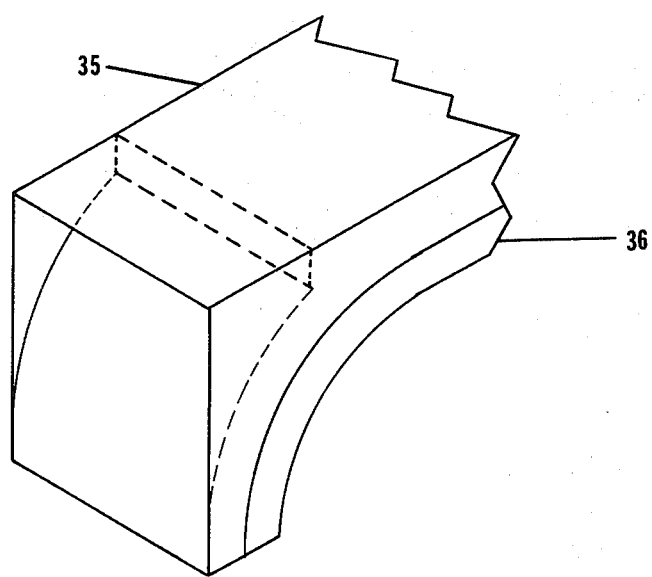
FIG. 5 is an isometric view of the forwardmost part of the splash and spray shield illustrating the air collector scoop according to this invention.

FIG. 5 illustrates an isometric view of the forwardmost part of the splash and spray shield 35 and the air collector scoop according to this invention.

Another embodiment of the invention is an aerodynamically designed air collector, known as a "scoop" in a kit form, that can be utilized in combination with many different types or models of apparatus to convert them into a highway vehicle splash and spray shield utilizing the theory and scope of the present invention.

It is to be understood that various modifications and changes may be made within the scope of the appended claims, without departing from the true spirit and scope of the present invention.

It is claimed and desired to be secured by Letters Patent:

1. A device for controlling the discharge of wet weather splash and spray of a highway vehicle comprising a shield consisting of a unit with side walls and a top wall that covers the uppermost forward part, over the top of and the uppermost rearward part of a wheel, or dual wheels, or a set of wheels of adjacent axles, the uppermost forward section of said shield comprising an air collector known as a "scoop", which is aerodynamically designed to collect and direct the flow of air caused by the forward movement of the vehicle, across the top of, backwardly and downward, behind the wheel or wheels or most rearward wheels of a set of adjacent axles, directly to the road surface, said air scoop utilizing the outer surface of the forward arcuately shaped portion of said shield as its arcuate bottom wall, and having generally triangular side members extending upwardly from the respective side edges of said bottom wall, and a generally horizontal top wall interconnecting the top edges of said side members, said air scoop defining an enlarged front opening and a constricted rear opening through which the flow of air is forcefully directed rearwardly along the top wall of said shield.

2. A device according to claim 1 which has a resilient shield extension fastened to the lowermost rearward section of said shield.

3. A device according to claim 1, wherein the lower edges of said side walls are arcuately shaped in approximate conformity with the arcuacy of the wheel periphery.

4. A device according to claim 1, wherein a resilient extension is fastened to at least one of the lower edges of said side walls, which is continuous from front to back and is arcuately shaped in approximate conformity with the arcuacy of the wheel periphery.

* * * * *